April 7, 1959  F. APFELBAUM  2,880,815
VEHICLE BRAKE OPERATION RESPONSIVE SAFETY SEAT DEVICE
Filed May 5, 1955  2 Sheets-Sheet 1
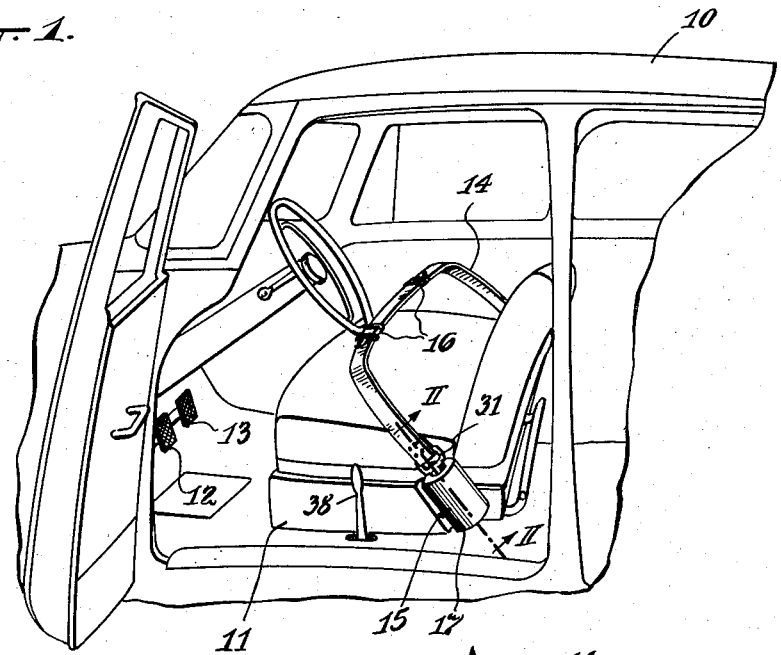
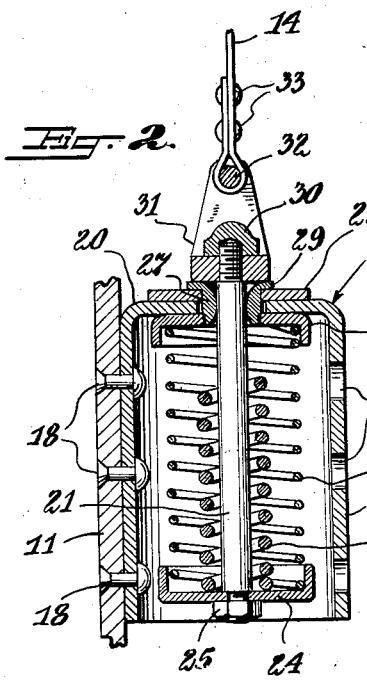
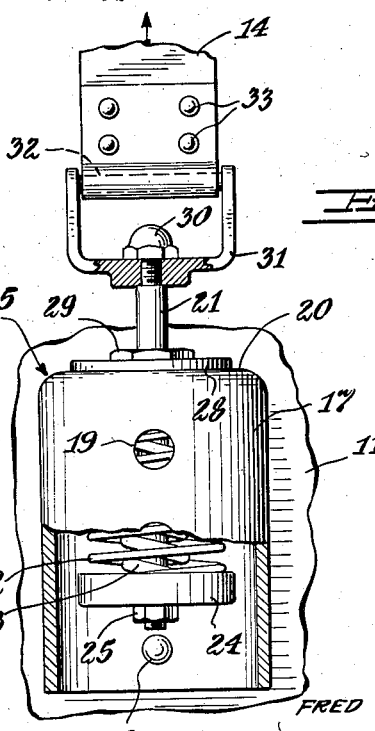
INVENTOR.
FRED APFELBAUM.
BY
Howard P. King
ATTORNEY.

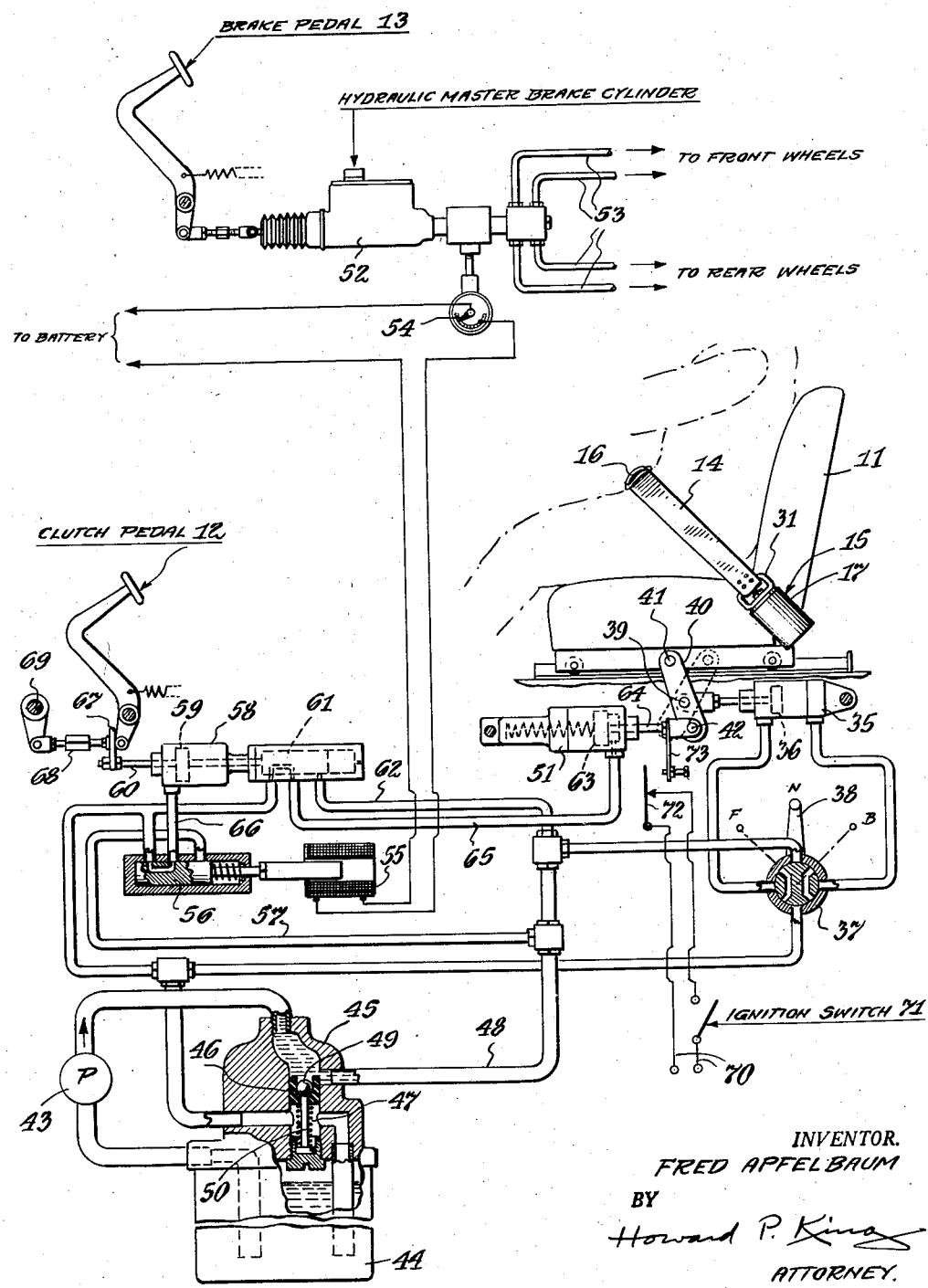

2,880,815

VEHICLE BRAKE OPERATION RESPONSIVE SAFETY SEAT DEVICE

Fred Apfelbaum, New York, N.Y.

Application May 5, 1955, Serial No. 506,119

6 Claims. (Cl. 180—82)

This invention relates to safety devices, and more especially to such as applied to motor vehicles.

Many serious injuries and casualties have occurred in motor vehicles caused by sudden stop of the vehicle due to brake locking, crash or otherwise, resulting in front-seat occupants being impelled against the dashboard, windshield or other part of the vehicle. In its broad aspect, the present invention proposes lessening the effect of such sudden stops upon the vehicle occupants and to prevent injury to them so far as possible.

A general object of the invention is to counteract forward momentum of the occupants of the vehicle in event of sudden stopping of the vehicle.

Another general object of the invention is to restrain the occupants from being thrown from the seat on which they are riding as a consequence of sudden stopping of the vehicle.

More specifically, the invention proposes confining all occupants of a seat to that seat by a single restraining means common to all.

As a refinement of the last-given object, I propose a confining means which may be manipulated by any one of the occupants of the seat utilizing said means.

A further object of the invention is to automatically reduce the momentum of the occupants and to provide cushioning means for absorbing much of the remaining momentum of the occupants when the vehicle is stopped suddenly.

Yet another object of the invention is to remove all possible hazards by automatically throwing-out the clutch and cutting the ignition.

Other objects and advantages of the invention will appear to persons skilled in the art to which it appertains as the description proceeds, both by direct recitation thereof and by implication from the context.

Referring to the accompanying drawings, in which like numerals of reference indicate similar parts throughout the several views;

Figure 1 is a perspective view of a portion of a motor vehicle to which my invention is applied;

Figure 2 is a longitudinal section of one of the resilient mountings for a passenger safety belt;

Figure 3 is a view, partly in elevation and partly in section, looking in a direction from right to left of Fig. 2 and showing said mounting with tension applied by the belt; and Figure 4 is a view of the several mechanisms employed for retention of the occupants, for momentum reduction, clutch release and switch cut-out, partly in elevation, partly in section and partly diagrammatic.

In the specific embodiment of the invention illustrated in said drawings, the reference numeral 10 indicates a motor vehicle having a movable seat 11, clutch pedal 12 and brake pedal 13. The seat 11 is wide enough to accommodate at least two persons side by side. A feature of the present invention is provision of a safety belt 14 that extends across the entire seat and thereby is adapted to pass across the laps of all occupants of the seat and be effective whether there be one or more sitting there. The opposite extremities of the belt 14 are permanently attached to a resilient mounting designated generally by numeral 15. The mid part of the belt is equipped with any suitable and approved quick-opening buckle 16 and for vehicles having wide seats, two such buckles may be provided as indicated in Fig. 1. When persons enter the vehicle, one buckle is open so the occupants may sit down as usual, after which the belt is drawn across the laps of all persons on the seat and the open buckle is then closed thereby retaining the persons on the seat and preventing them from pitching forward therefrom in event of accident or sudden stop.

Since the seat 11 is movable, it is preferable to attach the resilient mounting 15 for the safety belt 14 to the seat so as to be equally effective in any position of said seat. As shown, a bracket, in the form of an inverted cup 17 is attached to a frame portion of said seat 11, as by rivets 18. When using a bracket of cup shape, riveting is made easier by having holes 19 diametrically opposite to the rivets for receiving a tool to engage the rivet heads. Extending through the transverse portion 20 of said bracket 17 is a rod 21 the opposite ends of which are shown threaded. Around said rod and below the transverse portion 20 of the bracket, I provide resilient means, here shown as a pair of substantially coaxial spiral compression springs 22, 23 held at their bottom ends by a peripherally flanged spring-follower 24 clamped, by nut 25, on the lower threaded end of said rod 21 in a plane transverse thereto. The outer one 22 of said springs is shown longer than and of lighter stock than the inner one 23 and at its upper end bears against and is confined by a flanged disc 26 herein referred to as a spring seat. Said spring seat is centrally apertured and threaded, and receives the lower threaded end of a collar 27 which projects above the transverse wall 20 of the bracket and slidably passes said rod 21 therethrough. Said collar also projects through a washer or disc 28 located flatwise on the top of said transverse wall 20, the collar having an outwardly projecting rim or shoulder 29 bearing on the top face of said washer. By screwing the collar into spring seat 26 said seat and washer are clamped tightly in place on the wall 20. The interior bore of the collar may be conveniently given a curving flare toward both ends so as not to bind against the rod when tension on said rod deviates from precise coaxial direction with respect to said bore.

At the upper threaded end of said rod 21, held thereon by a nut 30 is a U-shaped shackle 31 and extending between and carried by the side arms of said shackle is a rung 32 around which the end of the belt 14 is looped and held, as by rivets 33. Tension on the belt will consequently be applied to said shackle 31 and thence to rod 21 first compressing spring 22 of lighter stock until lost-motion space for the heavier-stock spring is taken up, and then both springs become effective to resist the tension on the belt.

It will be understood that there is a resilient mounting 15 at each end of the belt, and thus, when the vehicle stops suddenly, the momentum of the persons having the belt across their laps will be progressively absorbed by compression of the several springs at the ends of the belt until the springs are completely compressed, and then the force of any remaining momentum applies in full without further yielding between the belt and the seat. According to my invention, however, I provide for still further absorption of the momentum of the occupants, accomplished by cushioned movement of the seat.

The invention is illustrated in connection with a seat that is equipped with an electro-mechanical shifting means with which some cars are presently equipped for enabling a driver to adjust the seat, back and forth, to a comfortable position for driving the vehicle. Prior art equipment for such seat adjustment is here shown as providing a hydraulic cylinder 35 arranged to receive fluid pressure at either end thereof, in front of or behind a piston 36 with appropriate discharge of fluid from the end opposite to that into which pressure is being applied, as by a four-way valve 37. For the sake of simplicity, I have shown the valve 37 operable manually by a lever 38 at the end of the seat adjacent to the driver, but in some cars the valve is electrically controlled. The piston applies its motivating force at a pivotal connection 39 to a lever 40 an end of which is pivoted at 41 to the seat frame. For purpose of this adjusting operation, said lever 40 has a fulcrum 42 which, although movable under other conditions, is fixed at the time the driver is making the seat adjustment.

Fluid pressure supply is shown derived herein according to prior art practice and includes a pump 43 suitably driven electrically or otherwise, receiving fluid from a sump or reservoir 44 and pumping it back under pressure to a pressure regulating head 45 shown at the top of the reservoir. In said head is a slide valve 46 which the fluid pressure from the pump can depress against resistance imposed by a spring 47 under the valve and pass the fluid to the system supply pipe 48. Said slide valve has a pocket receiving a ball 49 providing escapement for fluid when the ball is lifted to return the excess fluid to the reservoir. A fixed pin 50 projects into the bottom of said valve, so if the pressure depresses the valve farther than needed to supply the fluid to the line, the ball will be raised. It is this fluid pressure in supply line 48 that is applied to valve 37 above described. I utilize this same source of fluid pressure in conjunction with my invention.

It is a feature of my invention to provide a second cylinder 51 for shifting the seat automatically rearward when the vehicle is subjected to a sudden stop and to utilize the cushioning effect of the return of the seat against the fluid pressure to absorb a part of the momentum of the occupants of the seat. The details of this feature will be further described hereinafter. For the moment, it may be observed that sudden stops are almost invariably the result of the brakes locking the wheels, or by impact of the vehicle with some object. In the latter case, the driver instinctively applies the brakes with all the force he has available and far in excess of the force normally applied for usual braking purposes. Wheel locking is likewise caused by more than normal braking pressure being applied by the driver to the brake pedal 13. I make use of this fact of application of more than normal braking pressure, which for convenience will be referred to as excessive braking, to instigate operation of the alleviating of the effects on the vehicle occupants. For illustrative purposes, a hydraulic braking system has been arbitrarily chosen for incorporation of the invention.

At the top of Fig. 4 is shown the usual brake pedal 13 which operates the piston of a master brake cylinder 52 in accordance with the prior art to apply pressure to the several pipe lines 53 to the several brakes of the vehicle. In the line from said master cylinder to the several brakes, I include a pressure-operated electric switch 54 which makes closing contact only when the pressure from the master cylinder is in excess of that required for normal braking. Under excess braking conditions, said switch closes and supplies current to a solenoid 55 which slides a D-valve 56 from the normal position shown to a forward position where it completes a flow path for fluid from a branch 57 of supply pipe 48 to a clutch throw-out cylinder 58 behind the piston 59 thereof. The same piston rod 60 on which said piston rod 60 on which said piston 59 is carried conveniently extends to and operates another D-valve 61 from a normal position to a forward position where it completes a flow path for fluid from a branch 62 of supply pipe 48 to aforementioned second seat-shifting cylinder 51. In the specific arrangement shown, piston 63 of the seat-shifting cylinder 51 is spring loaded to hold the piston normally to project the piston rod 64 its maximum distance, and in that position the outer end of said piston rod constitutes a fixed fulcrum for the seat-shifting lever 40. However, when fluid is admitted from pressure line pipe 48 and its branch 62 through D-valve 61 and connecting pipe 65 therefrom to said second seat-cylinder 51 to slide piston 63 and piston rod 64, pivot 39 of lever 40 functions as a fixed fulcrum and the seat 11 is shifted rearwardly under fluid pressure. This fluid pressure serves to cushion forward movement of the seat under impetus of momentum of the seat occupants as the fluid is caused to back-flow due to the extreme pressure exerted by such momentum operating on the fluid in the second seat cylinder which has to escape through the same pipes and valves by which it was admitted to the cylinder 51.

It may be noted that this back-flow pressure created in the second seat-shifting cylinder 51 does not cause any shift in position of the D-valves 61 or 56, and the fluid pressure continues to apply from line 48 through branch 57 to and through D-valve 56 and its connecting pipe 66 to the clutch throw-out cylinder 58. It is opportune to here mention that there is a dog 67 fast upon the protruding end of piston rod 60 which pulls on the lower end of clutch pedal 12 thereby pulling on the linkage 68 from the clutch pedal to the rocker shaft 69 by which clutch throw-out is obtained. The linkage 68 passes freely through said dog 67 so that normal operation of the clutch is not hindered since the pedal may be operated by the driver's foot in normal driving without moving said dog.

A further feature of the invention is to also break the ignition circuit to the engine so as to avoid danger of fire in event of a crash. I have accordingly diagrammatically indicated the ignition line 70 for the engine, together with an ignition switch 71 therefor which is usually located on the dash-board of the vehicle. An emergency switch 72 is included in series in this ignition line, said emergency switch to be operated automatically to open condition under the afore-described circumstance of excessive braking, but said switch to remain closed during normal driving of the vehicle. As here shown, an arm 73 is fixed on the piston rod 64 of the second seat-operating cylinder and appropriately located to engage and open said switch when pressure admitted to said cylinder slides said piston rod from normal position. When the emergency has passed and the excessive braking is released, the valves, pistons and switches return to their normal positions, and the vehicle may be driven as usual.

I claim:

1. A safety device for a motor vehicle having brake mechanism and having a seat located in a constantly forwardly facing position in the vehicle for the driver of said vehicle, said seat and vehicle having cooperating slidable mounting means supporting the seat to be movable forwardly and rearwardly in said vehicle, fluid pressure means for moving said seat rearwardly, a valve for controlling admission of fluid pressure to said fluid pressure means, and an operating connection between said brake mechanism and said valve opening said valve to supply fluid pressure to said fluid pressure means automatically in consequence of more than normal pressure applied to the said brake mechanism and thereby move said seat rearwardly.

2. A safety device in accordance with claim 1, wherein said fluid pressure means comprises a cylinder and a piston in the cylinder with a piston rod on the piston projecting from said cylinder, and a lever pivoted both to said seat and to said piston rod.

3. A safety device in accordance with claim 2, wherein a second fluid pressure cylinder and piston with a piston rod is provided and that piston rod also pivoted to said lever, the pivots for the lever on the two said piston rods providing selective fulcrums for said lever.

4. A safety device in accordance with claim 2, wherein said vehicle has an electric ignition circuit, and wherein a switch in series with said circuit is located proximate to said piston rod and means on the piston rod is located to engage and open said switch on movement of said piston rod in one direction when its piston is actuated by the fluid pressure.

5. A safety device for a motor vehicle having a seat located in a constantly forwardly facing position in the vehicle, said seat and vehicle having cooperating slidable mounting means supporting the seat to be movable forwardly and rearwardly, a lever connected to said seat for moving said seat forwardly and rearwardly, said lever having two pivots selectively usable as the fulcrum on which said lever may swing, means under operator manual control for operating one said pivot to apply force thereto for swinging the lever with the other pivot acting as the fulcrum, and means under automatic control of the vehicle operation for applying force to the said other pivot to swing the lever while the said one pivot acts as the fulcrum.

6. A safety device for a motor vehicle comprising a movable seat, said vehicle having brake mechanism, fluid pressure means having connection with and controlled by the said brake mechanism for automatically moving said seat rearward as a consequence of excessive braking of the vehicle and for obtaining forward cushioning motion for said seat from its rearward position under influence of forward momentum of the seat under condition of sudden stop of the vehicle, and a belt mounted on and movable with said seat for retaining an occupant in the seat under condition of sudden movement of the seat in either direction.

References Cited in the file of this patent
UNITED STATES PATENTS

| | | |
|---|---|---|
| 432,062 | Meeks | July 15, 1890 |
| 593,788 | Stone | Nov. 16, 1897 |
| 894,052 | Radtke | July 21, 1908 |
| 1,820,359 | Manning | Aug. 25, 1931 |
| 2,227,717 | Jones | Jan. 7, 1941 |
| 2,639,913 | Reynolds | May 26, 1953 |
| 2,705,529 | Bull et al. | Apr. 5, 1955 |
| 2,716,561 | Beran | Aug. 30, 1955 |
| 2,736,566 | Hartl | Feb. 28, 1956 |
| 2,777,531 | Erickson | Jan. 15, 1957 |